United States Patent
Hong (10) Patent No.: US 9,798,412 B2
(45) Date of Patent: Oct. 24, 2017

(54) TOUCH SENSOR DEVICE

(71) Applicant: Samsung Display Co., Ltd., Yongin, Gyeonggi-Do (KR)

(72) Inventor: Jung Moo Hong, Seoul (KR)

(73) Assignee: Samsung Display Co., Ltd. (KR)

( * ) Notice: Subject to any disclaimer, the term of this patent is extended or adjusted under 35 U.S.C. 154(b) by 62 days.

(21) Appl. No.: 14/701,327

(22) Filed: Apr. 30, 2015

(65) Prior Publication Data

US 2016/0179268 A1  Jun. 23, 2016

(30) Foreign Application Priority Data

Dec. 18, 2014  (KR) .......................... 10-2014-0183203

(51) Int. Cl.
*G06F 3/041* (2006.01)
*G06F 3/044* (2006.01)

(52) U.S. Cl.
CPC ............ *G06F 3/0416* (2013.01); *G06F 3/041* (2013.01); *G06F 3/044* (2013.01); *G06F 2203/04102* (2013.01)

(58) Field of Classification Search
CPC ..................... G06F 3/044; G06F 3/047; G06F 2203/04102–2203/04103
See application file for complete search history.

(56) References Cited

U.S. PATENT DOCUMENTS

| | | | |
|---|---|---|---|
| 2012/0162099 A1* | 6/2012 | Yoo | G06F 3/0412 345/173 |
| 2012/0256642 A1 | 10/2012 | Badaye et al. | |
| 2013/0300678 A1* | 11/2013 | Kang | G06F 3/044 345/173 |
| 2015/0185889 A1* | 7/2015 | Nakamura | G06F 3/044 345/173 |
| 2015/0241924 A1* | 8/2015 | Chang | G06F 3/044 349/12 |
| 2015/0310967 A1* | 10/2015 | Spath | H05K 3/4644 427/125 |
| 2016/0188098 A1* | 6/2016 | Her | G06F 3/0416 345/173 |

FOREIGN PATENT DOCUMENTS

| | | |
|---|---|---|
| KR | 10-1119269 A | 2/2012 |
| KR | 10-2012-0072793 A | 7/2012 |
| KR | 10-2013-0126007 A | 11/2013 |
| KR | 10-2014-0062269 A | 5/2014 |

* cited by examiner

*Primary Examiner* — Liliana Cerullo
(74) *Attorney, Agent, or Firm* — Innovation Counsel LLP (57) ABSTRACT

A flexible touch sensor device with improved durability is presented. More particularly, a flexible touch sensor device that can be bent or folded with low risk of damaging the wiring is presented. The touch sensor device includes: a plurality of first touch electrodes positioned at a first side of a first reference line extending in a first direction; a plurality of second touch electrodes positioned at a second side of the first reference line; first touch wiring connected to the first touch electrodes; and second touch wiring connected to the second touch electrodes, wherein the first touch wiring and the second touch wiring extend along a second direction that is non-parallel to the first direction without crossing the first reference line.

20 Claims, 9 Drawing Sheets

TOUCH SENSOR DEVICE

CROSS-REFERENCE TO RELATED APPLICATION

This application claims priority to and the benefit of Korean Patent Application No. 10-2014-0183203 filed in the Korean Intellectual Property Office on Dec. 18, 2014, the entire contents of which are incorporated herein by reference.

BACKGROUND (a) Technical Field

The present disclosure relates to a touch sensor device. More particularly, the present invention relates to a flexible touch sensor device.

(b) Description of the Related Art

An electronic device such as a liquid crystal display (LCD), an organic light emitting diode display (OLED display), and an electrophoretic display may include a touch sensing function such that it is capable of interaction with a user. A touch sensing function determines whether an object (a user's finger, touch pen, etc.) touches a screen, and information about the touch, by sensing a change of pressure, light, etc., that occurs on a screen in the display device when a finger or a touch pen contacts the screen to write a character, draw a picture, etc.

The touch sensing function of the several electronic devices may be realized through a touch sensor. The touch sensor may be classified into various types such as a resistive type, a capacitive type, an electromagnetic (EM) type, and an optical type.

For example, the capacitive touch sensor includes a sensing capacitor formed by a sensing electrode which may transfer a sensing signal, and senses a change in capacitance of the sensing capacitor generated when a conductor such as a finger approaches the touch sensor to determine the existence of a touch, a touch position, and the like. The capacitive touch sensor may include a plurality of touch electrodes disposed in a touch sensing region sensing the touch and touch wiring connected to the touch electrodes. The touch wiring may transmit a sensing input signal to the touch electrode and transmit a sensing output signal of the touch electrode generated depending on the touch to a touch driver.

The touch sensor may be installed in the display device (an in-cell type), formed on an outer surface of the display device (an on-cell type), or attached to a separate touch sensor panel to the display device (an add-on cell type). Particularly, in a case of the flexible display device, a method (add-on cell type) of adhering a film in which the touch sensor is formed or forming and adhering a separate touch sensor device of a plate shape on the display panel may be used.

When electronic devices such as the display device and the touch sensor device use a glass substrate that is heavy and easily damaged, its portability and scalability to a large-scale screen display get limited. Thus, recently, a flexible electronic device which is light, durable, more impact-resistant, and having a plastic substrate with high flexibility such as PI has been actively developed. In this case, the flexible touch sensor device may include a portion that is exemplarily bendable, foldable, rollable, stretchable in at least one direction, or is elastic and is able to be deformed.

The flexible touch sensor device includes a plurality of touch electrodes, and the touch electrodes may have flexibility to not generate a failure after deformation.

As a material for the touch electrode having flexibility, various materials such as metal nanowire (e.g., silver nanowire or AgNW), carbon nanotubes, graphene, a metal mesh, and a conductive polymer have been actively developed.

The above information disclosed in this Background section is only for enhancement of understanding of the background of the invention and therefore it may contain information that does not form the prior art that is already known in this country to a person of ordinary skill in the art.

SUMMARY

In one aspect, the inventive concept is a flexible touch sensor device with a lowered risk of damage to the touch electrode and the touch wiring upon being bent or folded.

In another aspect, the present inventive concept improves touch sensitivity by reducing the size of a non-sensing region, which is a dead space region of the flexible touch sensor device.

In yet another aspect, the present inventive concept reduces a bezel width of the touch sensor device by reducing a non-sensing region, which is a dead space region of the flexible touch sensor device.

In yet another aspect, the present inventive concept obtains a margin of sheet resistance for the touch electrode by reducing resistance of the touch wiring of the flexible touch sensor device.

A touch sensor device according to an exemplary embodiment includes: a plurality of first touch electrodes positioned at a first side of a first reference line extending in a first direction; a plurality of second touch electrodes positioned at a second side of the first reference line; first touch wiring connected to the first touch electrodes; and second touch wiring connected to the second touch electrodes, wherein the first touch wiring and the second touch wiring extend along a second direction that is non-parallel to the first direction without crossing the first reference line.

The touch sensor device may be folded or bent along the folding line, and the folding line may extend in a direction substantially parallel to the second direction.

The touch sensor device may include a touch sensing region and at least one peripheral area adjacent to the touch sensing region, the first touch wiring may include first inner touch wiring may be positioned in a touch sensing region and first outer touch wiring connected to the first inner touch wiring and positioned in the peripheral area, the second touch wiring may include second inner touch wiring positioned in the touch sensing region and second outer touch wiring connected to the second inner touch wiring and positioned in the peripheral area, and the first outer touch wiring and the second outer touch wiring may include a portion extending substantially parallel to the first direction.

The first and second touch electrode and the first and second inner touch wiring may include at least one same conductive layer.

The at least one conductive layer may include a first conductive layer including a metal nanowire and a second conductive layer positioned on the first conductive layer.

The first and second outer touch wiring may include the at least one conductive layer and a third conductive layer positioned on the at least one conductive layer and having lower resistance than the at least one conductive layer.

The first and second touch electrodes and the first and second touch wiring may include a first conductive layer and a second conductive layer positioned on the first conductive layer, and the second conductive layer included in the first and second touch electrodes may include at least one opening.

The at least one opening may include a plurality of slits arranged in the first direction, and the slits may extend to be substantially parallel to the second direction.

The opening may expose most of the first conductive layer included in the first and second touch electrodes.

The first and second outer touch wiring may extend to a pad portion that is positioned at one side of the touch sensing region in which the plurality of first and second touch electrodes are positioned.

The touch sensor device can be folded or bent with respect to the folding line, and the folding line may extend in a direction substantially parallel to the first direction or the second direction.

The first touch wiring may extend to a first pad portion positioned at a peripheral area at a first side of a touch sensing region, and the second touch wiring may extend to a second pad portion positioned at a peripheral area at a second side facing the first side with respect to the touch sensing region.

A plurality of third touch electrodes positioned at a second region different from the first region in which the first and second touch electrodes are positioned and third touch wiring connected to the third touch electrode may be further included, and the third touch wiring may include a portion extending in a direction substantially parallel to the first direction.

The third touch wiring may extend to the pad portion.

The first touch electrode, the second touch electrode, and the third touch electrode may include at least one same conductive layer.

Also, by reducing the non-sensing region of the touch sensor device, which is the dead space region, the touch sensitivity may be improved and the bezel width of the touch sensor device may be reduced.

Further, by reducing the resistance of the touch wiring of the touch sensor device, the margin of the sheet resistance of the touch electrode may be obtained.

DETAILED DESCRIPTION OF THE EMBODIMENTS

The present inventive concept will be described more fully hereinafter with reference to the accompanying drawings, in which exemplary embodiments are shown. As those skilled in the art would realize, the described embodiments may be modified in various different ways, all without departing from the spirit or scope of the inventive concept.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may be present. In contrast, when an element is referred to as being "directly on" another element, there are no intervening elements present.

To clarify the present invention, descriptions of irrelevant portions are limited, and like numbers refer to like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

Now, a touch sensor device according to an exemplary embodiment of the present invention will be described with reference to FIG. 1 and FIG. 2.

Figure 1:
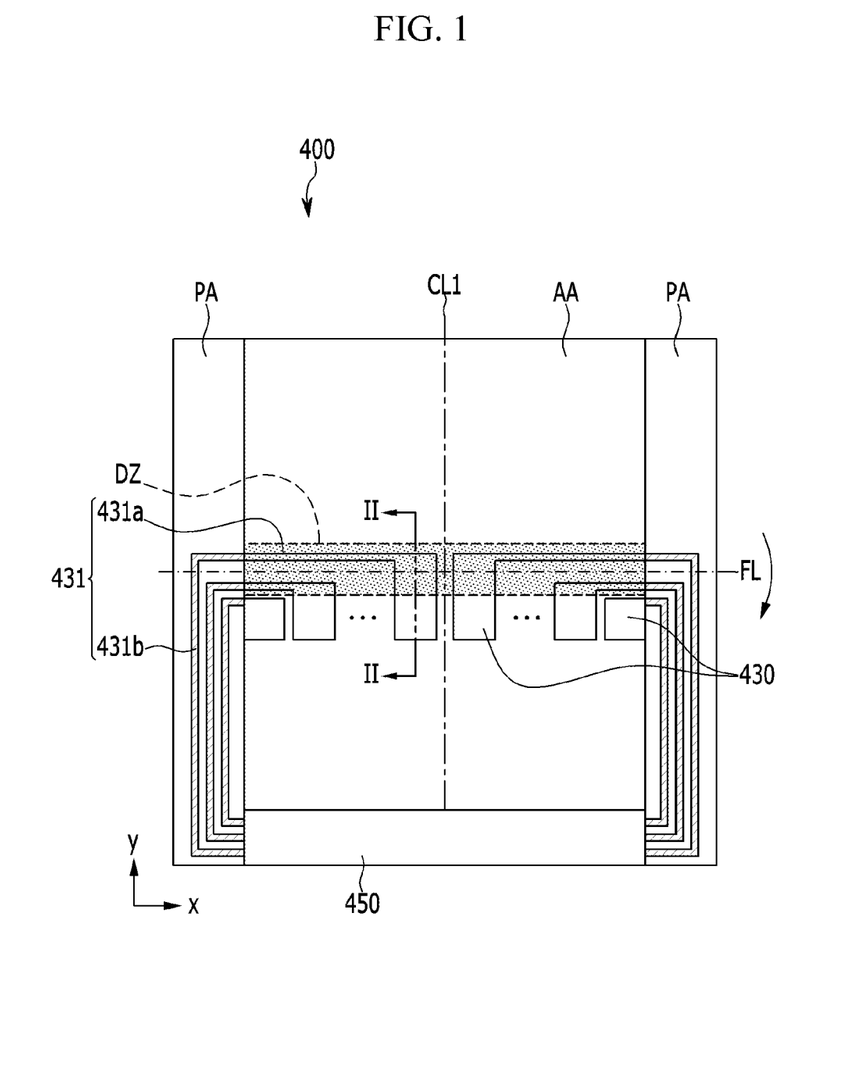
FIG. 1 is a layout view of a touch sensor device according to an exemplary embodiment.
Figure 2:
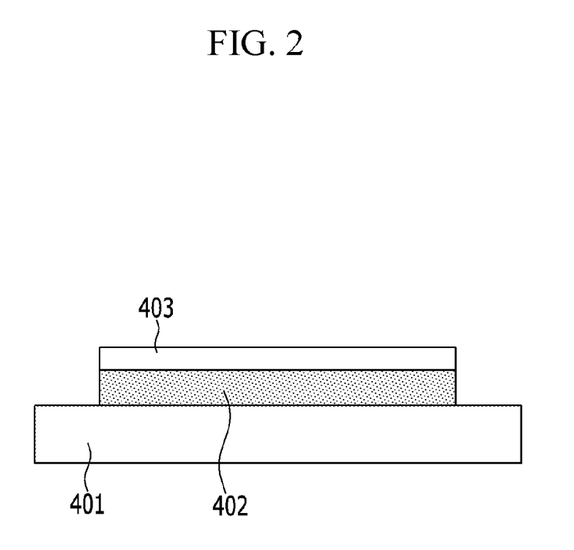
FIG. 2 is a cross-sectional view of the touch sensor device of FIG. 1 taken along a line II-II.

FIG. 1 is a layout view of a touch sensor device according to an exemplary embodiment, and FIG. 2 is a cross-sectional view of the touch sensor device of FIG. 1 taken along a line II-II.

Referring to FIG. 1, the touch sensor device 400 according to an exemplary embodiment includes a touch sensing region AA that is capable of sensing a touch and a non-sensing region that is not capable of sensing a touch. The non-sensing region includes a peripheral area PA positioned adjacent to or outside the touch sensing region AA, and an inner non-sensing region DZ. The inner non-sensing region DZ is positioned between two sections of the touch sensing region AA. The non-sensing region is herein also referred to as a dead space.

FIG. 1 shows one inner non-sensing region DZ; however, it is not limited thereto. That is, a plurality of inner non-sensing regions DZ may be positioned in the touch sensing region AA of the touch sensor device 400, and the plurality of inner non-sensing regions DZ may be arranged in a y-direction. Each inner non-sensing region DZ may substantially extend along an x-direction as shown in FIG. 1. However, it is not limited thereto, and it may form an acute angle with the x-direction. The inner non-sensing region DZ may be formed across the touch sensing region AA in about the x-direction.

The touch sensor device 400 may be bent or folded along an imaginary folding line FL. That is, both sides of one touch sensor device 400 may be bent or folded with respect to the folding line FL to be close to each other. In this case, the touch sensor device 400 may receive a strongest stress at the folding line FL, and the curvature radius near the folding line FL may be smallest. The folding line FL may be substantially parallel to the x-direction but the inventive concept is not limited thereto.

The folding line FL, as shown in FIG. 1, may overlap the inner non-sensing region DZ. However, this is not a limitation of the inventive concept.

A plurality of touch sensors are positioned in the touch sensing region AA. The touch sensor may each sense a contact through various methods. The touch sensor may be classified into various types such as a resistive type, a capacitive type, an electromagnetic type, and an optical type.

For convenience, the exemplary embodiment will be described as incorporating a capacitive touch sensor.

The touch sensor according to an exemplary embodiment includes a plurality of touch electrodes 430 positioned in the touch sensing region AA. The plurality of touch electrodes 430 may be arranged in an approximate matrix, and may have different sizes or different shapes depending on a position.

Referring to FIG. 1 and FIG. 2, the touch electrode 430 may be positioned on a touch substrate 401. The touch substrate 401 may include a flexible film having flexibility. The touch substrate 401 may include plastic such as polyethylene terephthalate (PET), polyethylene naphthalate, polycarbonate, polyarylate, polyetherimide, polyether sulfone, polyimide, and the like.

The shape of the touch electrode 430, as shown in FIG. 1, may be a quadrangle, such as a rectangle or a rhombus, although this is not a limitation of the inventive concept and various other shapes may be suitable. Particularly, the touch electrode 430 may include a plurality of protrusions and depressions formed in an edge side to increase touch sensitivity. When the edge side of the touch electrode 430 includes a plurality of protrusions and depressions, the protrusions and depressions of the edge side of the touch electrode 430 may be engaged with each other.

The touch electrodes 430 may be arranged approximately in matrix form and may have different sizes or different shapes depending on the position.

The touch electrodes 430 may be formed at the same layer in a view of the cross-sectional structure. The touch electrodes 430 may have light transmittance above a predetermined value, and may include at least one conductive layer. For example, each touch electrode 430 may include a first conductive layer 402 and a second conductive layer 403 positioned thereon.

The first conductive layer 402 may include a metal nanowire such as a silver nanowire (AgNW), a metal mesh, carbon nanotubes (CNT), graphene, a transparent conductive material such as ITO (indium tin oxide) or IZO (indium zinc oxide), GIZP, and ZAO as a main conductive layer.

The second conductive layer 403 may include amorphous ITO or IZO as an assistance conductive layer. The second conductive layer 403 provides a backup electrical path for any disconnected portion on an inner structure of the first conductive layer 402 such that the current smoothly flows to the entire touch electrode 430 even if such disconnection happens. This way touch sensitivity is maintained at the desired level and the touch sensing failure is avoided. Particularly, when the first conductive layer 402 includes a metal nanowire such as silver nanowire, the metal nanowires may have parts that are not connected because of material characteristic, generating a disconnected portion. In an exemplary embodiment, the disconnected portion may be compensated for by forming the second conductive layer 403 on the first conductive layer 402.

The second conductive layer 403 may have a thickness of less than 500 Å to reduce cracks due to stress applied during the deformation of the touch sensor device 400.

The plurality of touch electrodes 430 may be connected to a touch driver (not shown) through touch wiring.

The touch wiring may include inner touch wiring 431a positioned in the inner non-sensing region DZ of the touch sensing region AA and outer touch wiring 431b positioned in the peripheral area PA.

The inner touch wiring 431a is connected to a corresponding touch electrode 430, and may extend approximately along the x-axis direction toward the peripheral area PA. The inner touch wiring 431a is connected to the outer touch wiring 431h near the peripheral area PA and the touch sensing region AA.

The inner touch wiring 431a may be disposed in the same layer as the touch electrode 430, and may include at least one conductive layer at the same layer as the touch electrode 430.

According to an exemplary embodiment, the inner touch wiring 431a may have light transmittance above the predetermined value like the touch electrode 430, and may include at least one conductive layer. For example, the inner touch wiring 431a may include the first conductive layer 402 and the second conductive layer 403 disposed thereon like the touch electrode 430.

The first conductive layer 402 may include the metal nanowire such as the silver nanowire (AgNW), the metal mesh, the carbon nanotubes (CNT), the graphene, and the transparent conductive material such as ITO, IZO, GIZP, and ZAO as the main conductive layer.

The second conductive layer 403 as the assistance conductive layer may include the amorphous ITO or IZO. The second conductive layer 403 provides the electrical path to assist a disconnected portion at the inner structure of the first conductive layer 402 such that the inner touch wiring 431a may allow the current to flow even when there is an intermediate electrical disconnection.

Particularly, when the first conductive layer 402 of the inner touch wiring 431a includes the metal nanowire such as the silver nanowire, if the width of the inner touch wiring 431a is increased to reduce the resistance, the area of the inner non-sensing region DZ is increased such that the touch sensing characteristic may be decreased and the width of the inner touch wiring 431a may be reduced. If the width of the inner touch wiring 431a is reduced, the density of the metal nanowire is locally decreased such that a disconnected portion where the current does not flow forms. However, the disconnected portion may be compensated for by the presence of the second conductive layer 403 on the first conductive layer 402 in the exemplary embodiment.

The second conductive layer 403 may have a thickness of less than 500 Å to reduce cracks in the inner touch wiring 431a due to stress applied during deformation of the touch sensor device 400.

Referring to FIG. 1, the inner touch wiring 431a connected to the touch electrode 430 disposed to the left of the imaginary longitudinal reference line CL1 of the touch sensor device 400 extends toward the left peripheral area PA. The inner touch wiring 431a connected to the touch electrode 430 disposed to the right of the longitudinal reference line CL1 extends toward the right peripheral area PA.

The longitudinal reference line CL1 may extend in the direction crossing the x-direction. For example, the longitudinal reference line CL1 may be substantially parallel to the y-direction. However, this is not a limitation of the invention. For example, some embodiments may have the longitudinal reference line CL1 extending obliquely with respect to the y-direction.

Referring to FIG. 1, a plurality of touch electrodes 430 positioned at different sides with respect to the longitudinal reference line CL1 may be disposed symmetrically with respect to the longitudinal reference line CL1. The touch electrode 430 is not formed in the region in which the inner touch wiring 431a is disposed. Hence, the touch electrode 430 close to the longitudinal reference line CL1 may have a large area. The size of inner touch wirings 431a decreases going from the longitudinal reference line CL1 toward the peripheral area PA in the x-direction. At the same time, the number of inner touch wirings 431a per unit area may increase as the size of each inner touch wirings 431a increases.

The region in which a plurality of adjacent inner touch wirings 431a are disposed is included in the region that may not sense the touch without the touch electrode 430, thereby forming the inner non-sensing region DZ. That is, the width of the inner non-sensing region DZ in the y-direction may be determined by the width of the region occupied by the inner touch wirings 431a extending to be adjacent to each other.

According to an exemplary embodiment of the present inventive concept, the portion of the inner touch wiring 431a that extends in the x-direction may be substantially parallel to the folding line FL. Accordingly, when the touch sensor device 400 is bent or folded along the folding line FL, the stress applied to the inner touch wiring 431a is reduced, and the orientation of the inner touch wiring 431a may prevent cracks or other damages from being generated.

Also, since the inner touch wiring 431a is disposed to be divided into both sides with respect to the longitudinal reference line CL1, the area of the inner non-sensing region DZ may be reduced compared with a case where the touch wiring extends to just one side in the touch sensing region AA. Particularly, when the longitudinal reference line CL1 is positioned at the center of the touch sensing region AA, the area of the inner non-sensing region DZ may be reduced to about half compared with the case where the touch wiring extends to just one side in the touch sensing region AA. Accordingly, the touch sensitivity and the touch sensing characteristic may be improved.

Also, since the inner touch wiring 431a is disposed to be divided into two sides with respect to the longitudinal reference line CL1, the inner touch wiring 431a may be short compared to the case where the touch wiring extends to one side in the touch sensing region AA. For example, when the longitudinal reference line CL1 is disposed at the center of the touch sensing region AA, the length of the inner touch wiring 431a may be shortened to about half compared to the case where the touch wiring extends all the way across the touch sensing region AA. Accordingly, in the process of forming the inner touch wiring 431a, a rate of the failure may be reduced in the inner touch wiring 431a, thereby improving a process yield. In addition, the entire resistance of the inner touch wiring 431a may be reduced depending on the reduction in length of the inner touch wiring 431a such that the margin of the sheet resistance of the touch electrode 430 may be further obtained.

The outer touch wiring 431b may extend substantially along the y-direction in the peripheral area PA. The outer touch wiring 431b may be connected to the driver in a pad portion 450 of the peripheral area.

The touch driver may be mounted on the pad portion 450 as at least one IC chip, mounted on the flexible printed circuit film to be connected to the pad portion 450 as a TCP, or mounted on a separate printed circuit board (PCB) to be connected to the pad portion 450. The touch driver may be connected to the outer touch wiring 431b through the pad portion 450.

The outer touch wiring 431b may include the first and second conductive layers 402 and 403 included in the touch electrode 430 and the inner touch wiring 431a, and/or a low resistance conductive layer. The low resistance conductive layer may include a metal such as molybdenum (Mo), silver (Ag), titanium (Ti), copper (Cu), palladium, aluminum (Al), or molybdenum/aluminum/molybdenum (Mo/Al/Mo), or a low resistance material such as a metal alloy of APC (silver palladium copper).

According to an exemplary embodiment, the outer touch wiring 431b connect to the inner touch wiring 431a, which in turn connect to the touch electrode 430 on a one-to-one basis. As illustrated in FIG. 1, the touch electrodes 430 are arranged in one row and are divided in the peripheral area PA positioned at both sides of the longitudinal reference line CL1 of the touch sensor device 400. Accordingly, compared to the case where all the outer touch wiring 431b extends along one peripheral area PA, the width of the peripheral area PA, which is determined by a number and a width of the outer touch wiring 431b, may be reduced. Consequently, a bezel width of the touch sensor device 400 can be reduced.

The touch electrode 430 may receive a sensing input signal through the touch wiring from the touch driver, and may generate a sensing output signal in response to the contact received by the touch driver. In this case, each touch electrode 430 has a self-sensing capacitance as the touch sensor, thereby being charged with a predetermined charge amount after receiving the sensing input signal. If contact with an external object such as the finger is generated, a change of the charge amount is generated and the sensing output signal that is different from the input sensing input signal may be output. Next, after an external object such as a finger makes contact, the charge amount of the self-sensing capacitor is changed such that a different sensing output signal from the input sensing input signal may be output.

Alternatively, touch electrodes 430 adjacent to each other may form a mutual sensing capacitor having a function of the touch sensor. The mutual sensing capacitor may receive the sensing input signal through one of two adjacent touch electrodes 430, sense the change of the charge amount by the contact of the external object, and output the change of the charge amount as the sensing output signal through the rest of the touch electrodes 430 to the touch driver.

Next, the touch sensor device according to an exemplary embodiment of the present invention will be described with reference to FIG. 3 and FIG. 4 as well as the above-described drawings.

Figure 3:
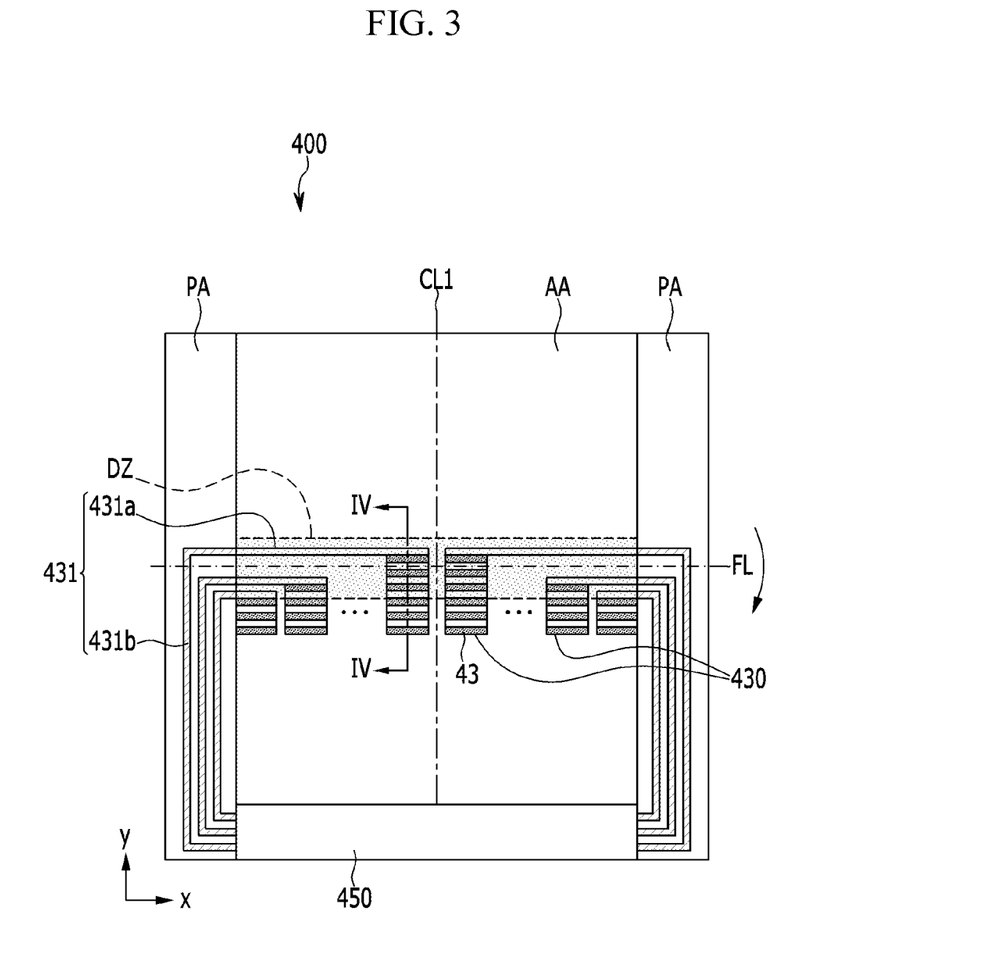
FIG. 3 is a layout view of a touch sensor device according to an exemplary embodiment.
Figure 4:
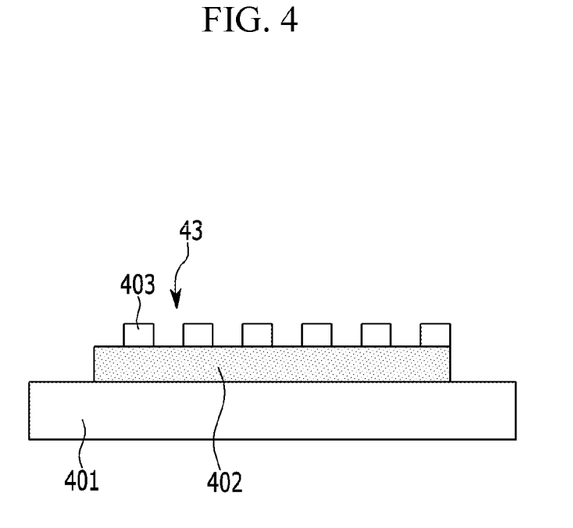
FIG. 4 is a cross-sectional view of the touch sensor device of FIG. 3 taken along a line IV-IV.

FIG. 3 is a layout view of a touch sensor device according to an exemplary embodiment of the present invention, and FIG. 4 is a cross-sectional view of the touch sensor device of FIG. 3 taken along a line IV-IV.

Referring to FIG. 3 and FIG. 4, the touch sensor device 400 according to an exemplary embodiment is the same as most of the touch sensor device 400 according to the above-described exemplary embodiment except for the touch electrode 430.

According to the exemplary embodiment of FIGS. 3 and 4, the second conductive layer 403 of the touch electrode 430 may include at least one opening 43 exposing the first conductive layer 402. The opening 43 may have a slit shape approximately along the x-direction. That is, the opening 43 of the second conductive layer 403 may extend to be substantial parallel to the folding line FL. Accordingly, the pattern of the second conductive layer 403 between the openings 43 may have a shape extending to be substantially parallel to the folding line FL.

When the second conductive layer 403 of the touch electrode 430 includes a plurality of openings 43, the plurality of openings 43 may be substantially disposed along the y-direction. The width and/or the size of the opening 43 of the second conductive layer 403 included in one touch electrode 430 may be constant or may be changed depending on the position.

In the present exemplary embodiment, the inner touch wiring 431a may include both the first conductive layer 402 and the second conductive layer 403.

According to the present exemplary embodiment, the area of the second conductive layer 403 included in the touch electrode 430 is reduced such that any damage, such as a crack in the second conductive layer 403, may be prevented upon bending or folding of the touch sensor device 400. Particularly, the opening 43 of the second conductive layer 403 and the pattern of the second conductive layer 403 between the openings 43 have a shape extending approximately parallel to the folding line FL. As a result, the stress applied to the second conductive layer 403 of the touch electrode 430 may be reduced. Accordingly, the damage of the second conductive layer 403 of the touch electrode 430 may be prevented.

Next, the touch sensor device according to an exemplary embodiment will be described with reference to FIG. 5 and FIG. 6 as well as the above-described drawings.

Figure 5:
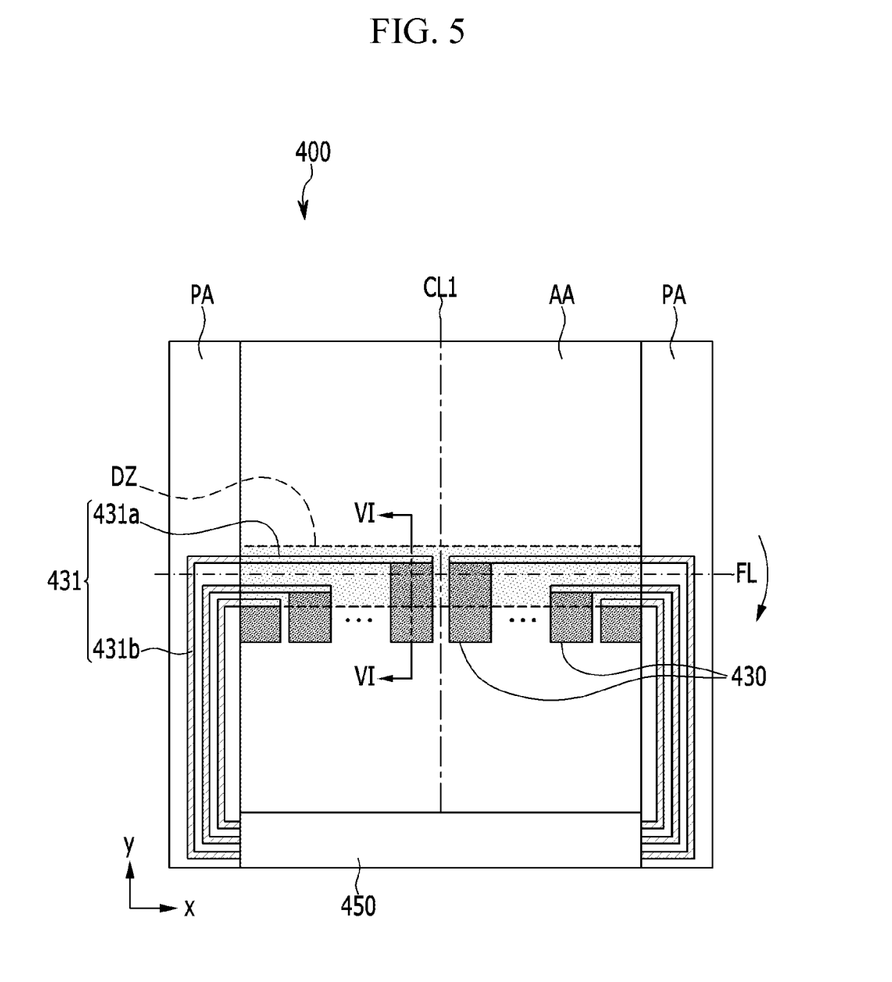
FIG. 5 is a layout view of a touch sensor device according to an exemplary embodiment.
Figure 6:
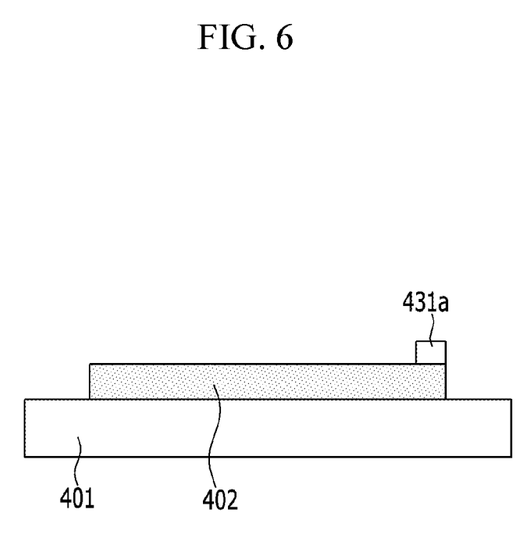
FIG. 6 is a cross-sectional view of the touch sensor device of FIG. 5 taken along a line VI-VI.

FIG. 5 is a layout view of a touch sensor device according to an exemplary embodiment, and FIG. 6 is a cross-sectional view of the touch sensor device of FIG. 5 taken along a line VI-VI.

Referring to FIG. 5 and FIG. 6, the touch sensor device 400 according to an exemplary embodiment is the same as most of the touch sensor device 400 according to the above-described exemplary embodiment, except for the touch electrode 430.

According to the exemplary embodiment of FIGS. 5 and 6, the touch electrode 430 does not include the second conductive layer 403 and may only include the first conductive layer 402. That is, more than half of the first conductive layer 402 of the touch electrode 430 is not covered by the second conductive layer 403. Where the first conductive layer 402 that is covered by a small second conductive layer 403, the second conductive layer 403 is part of the inner touch wiring 431a.

Hence, in the present exemplary embodiment, the inner touch wiring 431a may include both the first conductive layer 402 and the second conductive layer 403 unlike the touch electrodes 430.

When the inner touch wiring 431a having a relatively narrow line width includes only the first conductive layer 402, disconnection may occur. In anticipation of such disconnection, the second conductive layer 403 may be included in the inner touch wiring 431a to establish a backup connection. However, the failure risk of the touch not being sensed due to the disconnection is low because the touch electrode 430 is wide and large compared with the inner touch wiring 431a, which includes the first conductive layer 402 and the second conductive layer 403.

According to the present exemplary embodiment, since the touch electrode 430 does not include the second conductive layer 403 including ITO or IZO, damage (such as the crack) to the second conductive layer 403 may be avoided upon bending or folding the touch sensor device 400.

Next, the touch sensor device according to an exemplary embodiment will be described with reference to FIG. 7 as well as the above-described drawings.

Figure 7:
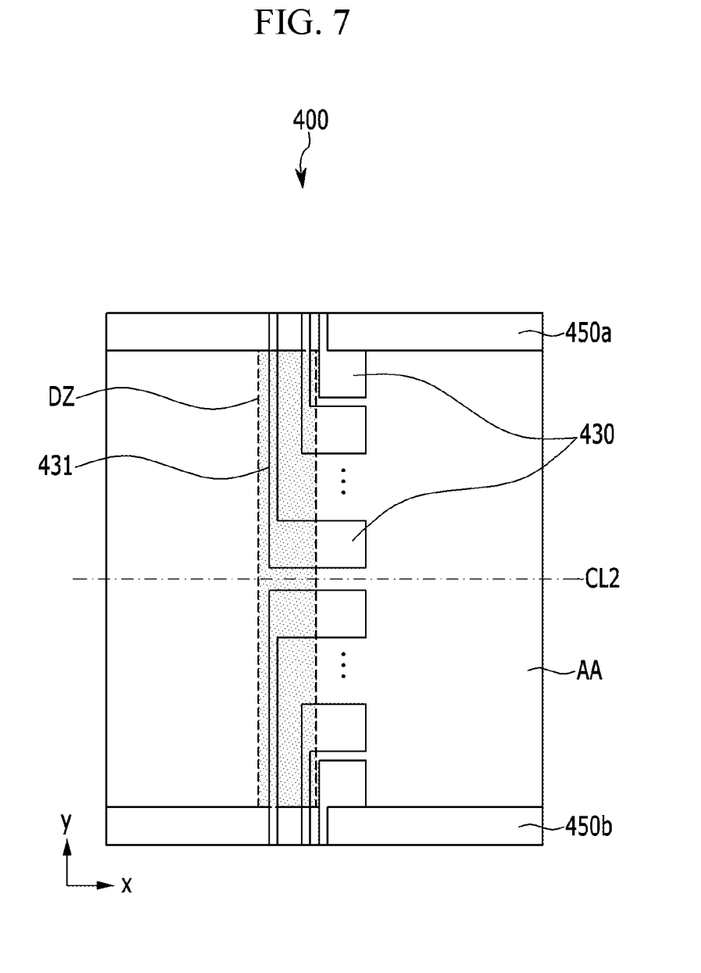
FIG. 7, FIG. 8, and FIG. 9 are layout views of a touch sensor device according to an exemplary embodiment.

FIG. 7 is a layout view of a touch sensor device according to an exemplary embodiment.

The touch sensor device 400 according to the embodiment of FIG. 7 is similar to most of the touch sensor device 400 shown in FIG. 1 and FIG. 2, except for the structure of the touch electrode 430 and the touch wiring 431.

According to the present exemplary embodiment, the touch electrode 430 may be connected to the touch driver (not shown) through the touch wiring 431.

The touch wiring 431 is connected to the corresponding touch electrode 430 and extends in the y-direction toward pad portions 450a and 450b.

An imaginary transverse reference line CL2 extends in the x-direction, dividing the touch sensor device 400 into two sections. The touch wiring 431 connected to the touch electrode 430 positioned to one side of the imaginary transverse reference line CL2 of the touch sensor device 400 extends toward the pad portion 450a, and the touch wiring 431 connected to the touch electrode 430 positioned to the other side of the transverse reference line CL2 extends toward the pad portion 450b.

The transverse reference line CL2 may extend in the direction crossing the y-direction. For example, the transverse reference line CL2 may be substantially parallel to the x-direction as shown in FIG. 7. However, this is not a limitation of the inventive concept. For example, the transverse reference line CL2 may extend obliquely with respect to the x-direction.

Referring to FIG. 7, a plurality of touch electrodes 430 positioned at different sides with respect to the transverse reference line CL2 may be disposed to be symmetrical with respect to the transverse reference line CL2. The touch electrode 430 is not formed in the region where the inner touch wiring 431a is disposed such that the touch electrode 430 close to the transverse reference line CL2 are larger than the touch electrodes 430 that are farther away from the transverse reference line CL2 (and closer to the pad portions 450a/b. The number of the inner touch wirings 431a increases with proximity to the pad portion 450a and 450b.

The touch driver may be mounted on the pad portion 450a and 450b as at least one IC chip, mounted on the flexible printed circuit film to be connected to the pad portions 450a and 450b as a type of a TCP, or mounted on a separate printed circuit board (PCB) to be connected to the pad portions 450a and 450b. The touch driver may be connected to the touch wiring 431 through the pad portions 450a and 450b.

Most of the region in which the plurality of adjacent touch wirings 431 are disposed does not include the touch electrode 430, thereby forming the inner non-sensing region DZ. That is, the width of the inner non-sensing region DZ in the y-direction may be determined by the width and number of the region occupied by the touch wirings 431 extending adjacent to each other.

The folding line at which the touch sensor device 400 may be bent or folded may be substantially parallel to the x-direction or the y-axis direction. When the folding line is substantially parallel to the x-direction, the folding line may substantially coincide with the transverse reference line CL2 or may be disposed adjacent thereto. In this case, the folding line may not overlap any touch electrode 430.

When the folding line is parallel to the y-direction, the folding line may overlap the inner non-sensing region DZ, as shown in FIG. 7. In this case, the touch wiring 431 may extend to be substantially parallel to the folding line. Accordingly, when the touch sensor device 400 is bent or folded along the folding line, the stress applied to the touch wiring 431 is reduced and any damage (e.g., a crack) to the touch wiring 431 may be avoided.

Also, the touch wiring 431 is disposed to be divided into two parts, one on each side of the transverse reference line CL2 such that the area of the inner non-sensing region DZ may be reduced compared with the case where the touch wiring extends across substantially the entire touch sensing region AA. Particularly, when the transverse reference line CL2 is positioned at or near the center of the touch sensing region AA, half the number of touching wires 431 extends across each side of the transverse reference line CL2, effectively reducing the area of the inner non-sensing region DZ to half compared to the case where the touch wiring extends across substantially the entire touch sensing region AA. Accordingly, the touch sensitivity and the touch sensing characteristic may be improved.

Also, since the touch wiring 431 is disposed to be divided into two parts with respect to the transverse reference line CL2, the touch wiring 431 may be short compared to the case where the touch wiring extends from one side of the touch sensor device 400 to the other. For example, when the transverse reference line CL2 is positioned at the center of the touch sensing region AA, the maximum length of the inner non-sensing region DZ may be half of what it would be if the touch wiring 431 extended all the way across the touch sensing region AA. Accordingly, in the process of forming the touch wiring 431, the ratio of the failure being generated in the touch wiring 431 may be reduced such that the process yield may be improved. Also, the resistance of the touch wiring 431 may be reduced proportionally to the length reduction of the touch wiring 431. Consequently, the sheet resistance margin of the touch electrode 430 may be obtained.

In the present exemplary embodiment, since the touch wiring is not positioned at the right and left sides of the touch sensor device 400, the right and left widths of the bezel may be reduced almost to zero.

Next, the touch sensor device according to an exemplary embodiment of the present invention will be described with reference to FIG. 8 as well as the above-described drawings.

Figure 8:
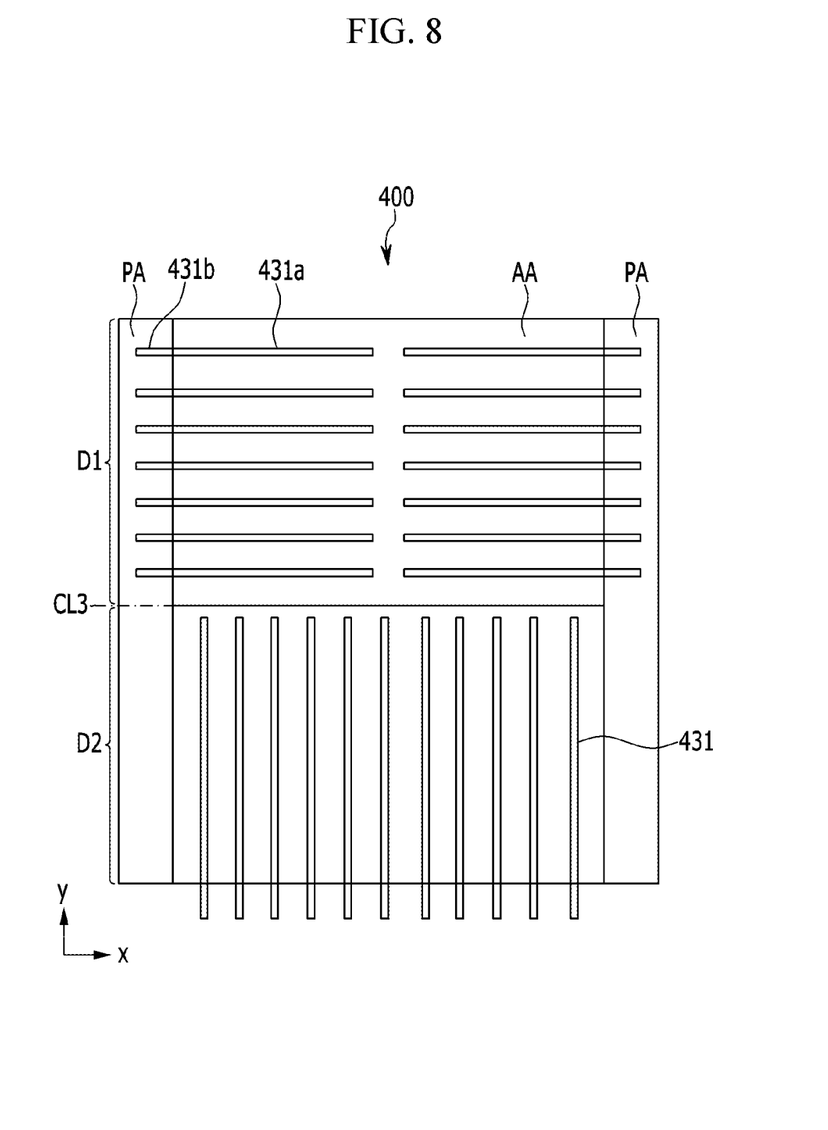
Figure 9:
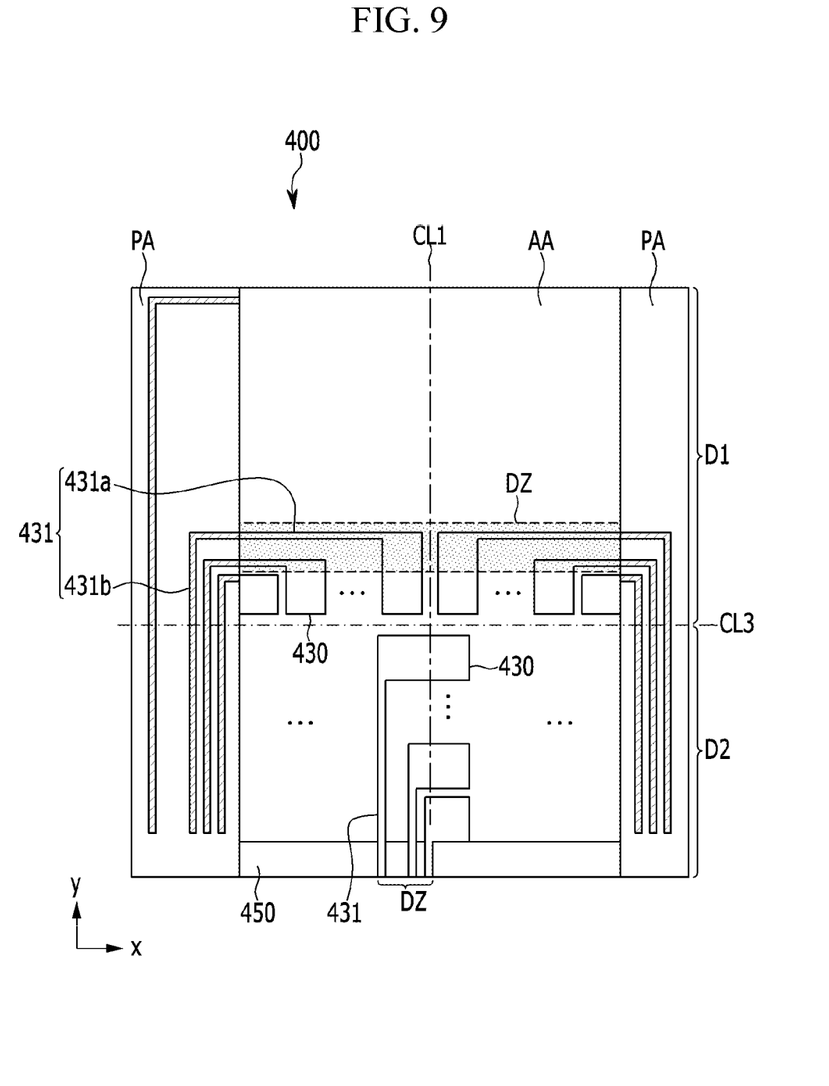

FIG. 8 and FIG. 9 are layout views of a touch sensor device according to an exemplary embodiment.

Referring to FIG. 8 and FIG. 9, the touch sensor device 400 according to an exemplary embodiment is similar to most of the touch sensor device 400 according to the exemplary embodiments described above, except for the structure and the arrangement of the touch wiring.

The touch sensing region AA of the touch sensor device 400 according to the present exemplary embodiment may include a first region D1 and a second region D2 with reference to a reference line CL3. In the first region D1 and the second region D2, the structure and the arrangement of the touch electrodes 430 and the touch wiring may be different from each other.

For example, referring to FIG. 9, the first region D1 may include the touch electrode 430 and the touch wiring 431a and 431b of the same structure as the touch sensor device 400 according to the exemplary embodiment shown in FIG. 1 to FIG. 6.

The touch wiring according to the plurality of touch electrode 430 may include the inner touch wiring 431a positioned at the touch sensing region AA and the outer touch wiring 431b positioned at the peripheral area PA. The inner touch wiring 431a is connected to the corresponding touch electrode 430, thereby extending toward the peripheral area PA in the approximate x-direction. The inner touch wiring 431a is connected the outer touch wiring 431b near the boundary of the peripheral area PA and the touch sensing region AA. The inner touch wiring 431a may be positioned at the same layer as the touch electrode 430, and may include at least one same conductive layer as the touch electrode 430. The inner touch wiring 431a may have light transmittance above a predetermined value to transmit light like the touch electrode 430, and may include at least one conductive layer. For example, the inner touch wiring 431a may include a first conductive layer 402 and a second conductive layer 403 positioned thereon, like the touch electrode 430. The second conductive layer 403 as the assistance conductive layer provides the electrical path to compensate the disconnection portion that may be generated on the structure of the first conductive layer 402 such that current flows through the inner touch wiring 431a without the electrical disconnection.

The inner touch wiring 431a connected to the touch electrode 430 positioned to the left of the imaginary longitudinal reference line CL1 of the touch sensor device 400 extends toward the peripheral area PA, and the inner touch wiring 431a connected to the touch electrode 430 positioned to the right of the longitudinal reference line CL1 extends toward the peripheral area PA. The plurality of touch electrodes 430 positioned at the different sides with respect to the longitudinal reference line CL1 may be arranged symmetrically to each other. In the region in which the inner touch wiring 431a is positioned, since the touch electrode 430 is not formed, the touch electrode 430 closer to the longitudinal reference line CL1 may be larger. The number of the inner touch wirings 431a extending adjacent to one another toward the peripheral area PA increases such that the area of the touch electrode 430 may be reduced with distance from the longitudinal reference line CL1.

The region in which the plurality of adjacent inner touch wirings 431a are positioned is included in the region that may sense the touch without the touch electrode 430, thereby forming the inner non-sensing region DZ. That is, the width of the inner non-sensing region DZ in the y-axis direction may be determined by the width of the region that the inner touch wiring 431a occupies.

The outer touch wiring 431b may approximately extend along the y-direction in the peripheral area PA. The outer touch wiring 431b may be connected to the touch driver in the pad portion 450 of the peripheral area. The outer touch wiring 431b may include the touch electrode 430 and the first and second conductive layers 402 and 403 included in the inner touch wiring 431a, and/or the low resistance conductive layer.

The second region D2 may include the touch wiring 431 extending along the y-direction like the exemplary embodiment shown in FIG. 7. In the second region D2, the touch wiring 431 (the third touch wiring) extends vertically (parallel to the longitudinal reference line) and may be connected to the touch driver in the pad portion 450. The region where the plurality of adjacent touch wirings 431 are positioned is included in the region that may sense the touch without the touch electrode 430, thereby forming the inner non-sensing region DZ. That is, the width of the inner non-sensing region DZ measured in the y-direction may be determined by the width of the region that the touch wiring 431 extending to be adjacent to each other occupies.

The folding line FL where the touch sensor device 400 may be bent and folded may be approximately parallel to the x-direction or the y-direction. When the folding line FL is approximately parallel to the x-direction, the folding line FL may substantially accord with the reference line CL3 or may be positioned to be close thereto, and may overlap the inner non-sensing region DZ of the first region D1. When the folding line FL is approximately parallel to the y-direction, the folding line FL may substantially accord with the reference line CL1 or may be positioned to be close thereto.

According to the present embodiment, the touch wiring 431 connected to the touch electrode 430 positioned at the second region D2 extends from the touch sensing region AA to be connected directly to the pad portion 450, thereby reducing the peripheral area of the right and left sides. Also, the outer touch wiring 431b connected to the inner touch wiring 431a connected to the touch electrode 430 disposed at the first region D1 is disposed to be divided in the peripheral area PA positioned at both sides with respect to the longitudinal reference line CL1 of the touch sensor device 400 such that the width of the peripheral area PA determined by the number and the width of the outer touch wiring 431b may be reduced. Accordingly, the bezel width of the touch sensor device 400 may be reduced.

While this inventive concept has been described in connection with what is presently considered to be practical exemplary embodiments, it is to be understood that the inventive concept is not limited to the disclosed embodiments. On the contrary, the inventive concept is intended to cover various modifications and equivalent arrangements included within the spirit and scope of the appended claims.

DESCRIPTION OF SYMBOLS

400: touch sensor device
401: touch substrate
402, 403: conductive layer
430: touch electrode
431: touch wiring
431a: inner touch wiring
431b: outer touch wiring

What is claimed is:

1. A touch sensor device comprising:
    a plurality of first touch electrodes positioned at a first side of a first reference line, the first reference line extending in a first direction;
    a plurality of second touch electrodes positioned at a second side of the first reference line;
    first touch wiring electrically connected to the first touch electrodes and a pad portion; and
    second touch wiring electrically connected to the second touch electrodes,
    wherein the first touch wiring and the second touch wiring extend along a second direction that is non-parallel to the first direction, the first touch wiring and the second touch wiring not crossing the first reference line;
    wherein the touch sensor device can be folded or bent along a folding line, and
    wherein the folding line extends in a direction substantially parallel to the second direction.

2. The touch sensor device of claim 1, wherein the touch sensor device includes a touch sensing region and at least one peripheral area adjacent to the touch sensing region, and wherein:
    the first touch wiring includes first inner touch wiring positioned in the touch sensing region and first outer touch wiring connected to the first inner touch wiring and positioned in the peripheral area;
    the second touch wiring includes second inner touch wiring positioned in the touch sensing region and second outer touch wiring connected to the second inner touch wiring and positioned in the peripheral area; and
    the first outer touch wiring and the second outer touch wiring include a portion extending substantially parallel to the first direction.

3. The touch sensor device of claim 2, wherein the first and second touch electrodes and the first and second inner touch wiring include at least one same conductive layer.

4. The touch sensor device of claim 3, wherein the at least one conductive layer includes a first conductive layer including a metal nanowire and a second conductive layer positioned on the first conductive layer.

5. The touch sensor device of claim 3, wherein the first and second outer touch wiring include the at least one conductive layer and a third conductive layer positioned on the at least one conductive layer and having lower resistance than the at least one conductive layer.

6. The touch sensor device of claim 2, wherein the first and second outer touch wiring extend to the pad portion, the pad portion being positioned at one side of the touch sensing region in which the plurality of first and second touch electrodes are positioned.

7. The touch sensor device of claim 1, wherein:
    the first and second touch electrodes and the first and second touch wiring include a first conductive layer and a second conductive layer positioned on the first conductive layer; and
    the second conductive layer included in the first and second touch electrodes includes at least one opening.

8. The touch sensor device of claim 7, wherein:
    the at least one opening includes a plurality of slits arranged in the first direction; and
    the slits extend to be substantially parallel to the second direction.

9. The touch sensor device of claim 7, wherein the opening exposes most of the first conductive layer included in the first and second touch electrodes.

10. The touch sensor device of claim 1, wherein the first and second touch electrodes and the first and second touch wiring include at least one same conductive layer.

11. The touch sensor device of claim 10, wherein the at least one conductive layer includes a first conductive layer including a metal nanowire and a second conductive layer positioned on the first conductive layer.

12. The touch sensor device of claim 11, wherein:
    the first touch wiring extends to a first pad portion positioned at a peripheral area at a first side of a touch sensing region; and
    the second touch wiring extends to a second pad portion positioned at a peripheral area at a second side facing the first side with respect to the touch sensing region.

13. The touch sensor device of claim 1, further comprising:
    a plurality of third touch electrodes positioned at a second region different from the first region in which the first and second touch electrodes are positioned; and
    third touch wiring connected to the third touch electrode,
    wherein the third touch wiring includes a portion extending in a direction substantially parallel to the first direction.

14. The touch sensor device of claim 13, wherein:
    the touch sensor device can be folded or bent with respect to a folding line; and
    the folding line extends in a direction substantially parallel to the first direction or the second direction.

15. The touch sensor device of claim 13, wherein the touch sensor device includes a touch sensing region and at least one peripheral area adjacent to the touch sensing region, and wherein:

the first touch wiring includes first inner touch wiring positioned in the touch sensing region and first outer touch wiring connected to the first inner touch wiring and positioned in the peripheral area;

the second touch wiring includes second inner touch wiring positioned in the touch sensing region and second outer touch wiring connected to the second inner touch wiring and positioned in the peripheral area; and the first outer touch wiring and the second outer touch wiring include a portion extending substantially parallel to the first direction.

16. The touch sensor device of claim 15, wherein the first and second outer touch wiring extend to a pad portion that is positioned along one edge of the touch sensing region, wherein the plurality of first and second touch electrodes are positioned in the touch sensing region.

17. The touch sensor device of claim 16, wherein the third touch wiring extends to the pad portion.

18. The touch sensor device of claim 13, wherein the first touch electrode, the second touch electrode, and the third touch electrode include at least one same conductive layer.

19. The touch sensor device of claim 1, wherein the first touch wiring and the second touch wiring are arranged symmetrically with respect to the first reference line.

20. A touch sensor device comprising:

a touch sensing region;

a first peripheral area and a second peripheral area opposing each other with the touch sensing region interposed therebetween;

a plurality of first touch electrodes positioned in the touch sensing region and at a first side of a first reference line, the first reference line extending in a first direction;

a plurality of second touch electrodes positioned in the touch sensing region and at a second side of the first reference line;

first touch wiring connected to the first touch electrodes; and second touch wiring connected to the second touch electrodes, wherein the first touch wiring and the second touch wiring extend, in the touch sensing region, along a second direction that is non-parallel to the first direction, the first touch wiring and the second touch wiring not crossing the first reference line, wherein the first touch wiring includes first inner touch wiring positioned in the touch sensing region and first outer touch wiring connected to the first inner touch wiring and positioned in the first peripheral area, wherein the second touch wiring includes second inner touch wiring positioned in the touch sensing region and second outer touch wiring connected to the second inner touch wiring and positioned in the second peripheral area, and wherein the first outer touch wiring and the second outer touch wiring include a portion extending substantially parallel to the first direction, and the first inner touch wiring includes a portion extending adjacent to and parallel to an edge of a first touch electrode of the plurality of first touch electrodes.

* * * * *